United States Patent
Delangis

[19]

[11] Patent Number: 6,146,075
[45] Date of Patent: Nov. 14, 2000

[54] COATING OF HOLES ON HYPERSONIC VEHICLES

[75] Inventor: Leo M. Delangis, Lomita, Calif.

[73] Assignee: The Boeing Company, Seal Beach, Calif.

[21] Appl. No.: 07/808,502

[22] Filed: Dec. 17, 1991

[51] Int. Cl.[7] .............................. F16B 35/04; F16B 19/06
[52] U.S. Cl. ........................................... 411/424; 411/507
[58] Field of Search ................................. 411/366, 424, 411/507

[56] References Cited

U.S. PATENT DOCUMENTS

| | | | |
|---|---|---|---|
| 3,995,406 | 12/1976 | Rosman | 411/507 |
| 4,126,076 | 11/1978 | Rosman | 411/507 |
| 4,355,531 | 10/1982 | Rosman | 29/243.529 X |
| 4,982,893 | 1/1991 | Ruckle et al. | 228/220 |
| 5,039,265 | 8/1991 | Rath et al. | 411/366 |
| 5,098,237 | 3/1992 | Harker | 411/424 |

*Primary Examiner*—Peter A. Nelson
*Attorney, Agent, or Firm*—Terrell P. Lewis; Lawrence N. Ginsberg

[57] ABSTRACT

A method and apparatus for applying a coating composition to a surface on at least one panel member using a fastener having the composition on its exterior. The fastener, which has a greater coefficient of thermal expansion, is fitted within the panel member, and during thermally-induced expansion, acts to facilitate diffusion of the composition into the panel surface. The coating composition is applied to the fastener via conventional methods to the fastener, and is engineered to react with the material of the panel member to form, via a diffusion process, an intermediate coating in the region of the panel member and coating materials.

7 Claims, 2 Drawing Sheets

COATING OF HOLES ON HYPERSONIC VEHICLES

BACKGROUND OF THE INVENTION

1. Field of the Invention

The present invention relates to the application of coatings to high temperature structures, as well as to a method of coating assembled aerodynamic structures so as to provide an impervious barrier at points of assembly to contaminants carried by an environment of high pressure fluid flow.

2. Background of the Invention

The use of high-strength, yet environmentally reactive metals, such as titanium alloys, is well-known in the aerospace industry. It is also well known to use coating compositions to prevent corrosion of these metals resulting from contaminants carried by fluids placed in contact with these metals.

Aerospace vehicles currently being designed for tomorrow's space travel (eg., the NASP vehicle) envision craft capable of ultra-high, indeed hypersonic (Mach 15 and above), velocities. At such speeds, the craft impacts the fluid of its environment with tremendous force. As such, the craft's structures, including points of connection, must withstand not only extreme pressures and temperatures, but also the forced imposition of corrosive environments.

It is therefore imperative that the aerodynamic, fluid-interactive structures and associated joints of these new vehicles be rendered as resistant to corrosive environments as possible. At present, two methods for accomplishing this objective are currently being used.

In the first method, a wet coating material is applied in pre-formed holes of a structure, and a fastener (either threaded or deformable) is inserted into the hole before being secured. However, this method is not desirable because during insertion of the fastener in the hole, the coating rubs off due to contact between the exterior surface of the fastener in the hole interior wall.

In the second method, a structural element is drilled to provide holes, and the element is then coated with a sealing composition. At final assembly, the holes are then reamed. This method has also proven less than desirable because some portion of the holes are left uncoated, and it is impractical to use this two-stage process for major assemblies.

OBJECTS AND SUMMARY OF THE INVENTION

It is therefore an object of the present invention to provide a novel method of applying coating materials to interconnections of aerodynamic structures to insure the integrity of the coating while overcoming all the deficiencies and disadvantages of known coating methods of like kind.

Another object of the present invention is to provide a novel method of applying coating material to joints at wall panels, barriers and stiffener members, such that the resulting structure remains impervious to a contaminated fluid environment.

Another object of the invention is to provide a method of providing a seal at the interconnection of structural members to establish a fluid-impervious, corrosive-resistant barrier at the points of connection between the structural members and the fasteners used to secure the structural members.

Yet another object is to provide a method and apparatus for transferring a corrosion-preventing coating from one surface where corrosion is not of concern to another surface where prevention of corrosion is of great concern.

These and other objects are accomplished by providing at least one panel member and a fastener having a corrosion-preventing composition on its exterior. The fastener is fitted within a hole in the panel member, and during thermal expansion and retraction, acts as a vehicle for applying the composition to the surface(s) defining the hole. More particularly, the invention resides in the application of a coating material via conventional methods to the fastener itself, where the coating material is engineered to react with the material of the panel member to form, via a diffusion process, an intermediate coating in the region of the panel member and coating materials.

DETAILED DESCRIPTION OF THE INVENTION

Figure 1:
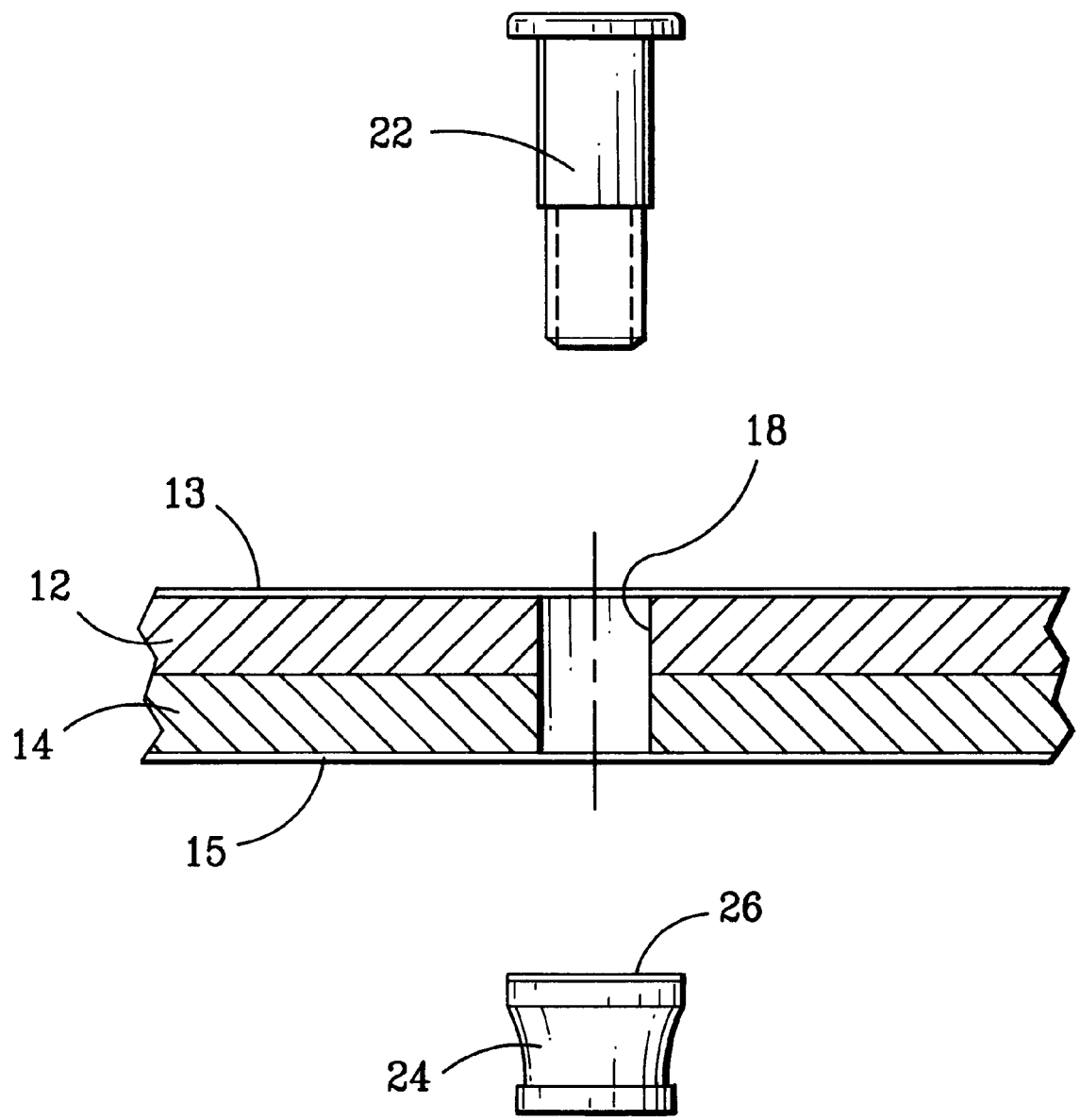
FIG. 1 is a sectional view of two structural members with fastener means prior to assembly.
Figure 2:
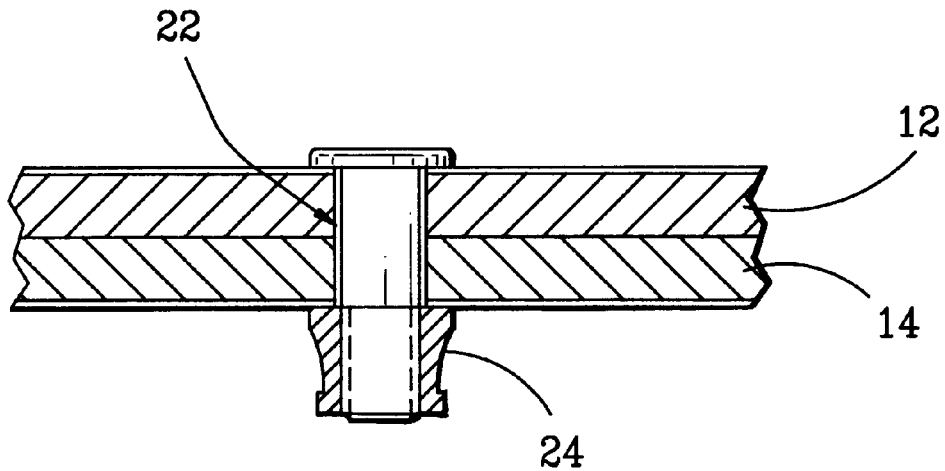
FIG. 2 is a sectional view of the two structural members of FIG. 1 after assembly with the fastener means.

Referring now to FIGS. 1 and 2, there is shown two panel-type structural elements 12 and 14. Panels 12 and 14 may be comprised of metallic, intermetallic, ceramic or metal matrix composite materials. Preferably, the materials used for panels 12 and 14 will be of a type which resist degradation of the physical or mechanical properties in an adverse, contaminating environment.

In the context of the present invention, when a connection of two panel members is desired, it is accomplished with the aid of a fastener assembly. FIGS. 1 and 2 show the interconnection of two panel members utilizing a fastener assembly of the kind which has a coefficient of expansion greater than that of the panel members, and which includes a threaded male fastener member 22 and an internally threaded female fastener member 24. It is to be understood that the fastener assembly shown in FIGS. 1 and 2 is intended to be exemplary only, and that other conventional fastener assemblies which lend themselves to the method of the present invention could also be used.

As shown, the two panel members are initially disposed atop one another in a predetermined, overlying and abutting relationship, and a hole 18 is drilled through the combined thickness of the two panels (FIG. 1). Thereafter, the male fastener member 22 is inserted into the hole from above the two panels so that the threaded portion of the male member extends below the two panels, and the female member 24 is then threaded onto and secured tightly against the male member (FIG. 2).

In accordance with the present invention, a coating composition (described in more detail below) is applied to the exterior surfaces of the male member of the fastener assembly.

As can be seen in the Figures, the coating composition may also be applied to selected surfaces 13 and 15 of panel members 12 and 14, respectively, and to the bearing surface 26 of the female member of the fastener assembly.

Desirably, the coating composition is one which has been engineered to react with the adjacent panel materials to form an intermediary coating layer, and/or one which is an intermetallic material that is environmentally resistant. An example of the coating material contemplated by this invention is a titanium aluminide. The coating material is one which will react, by heating, with the material of the panel structures and form an environmentally-resistant coating on the inside surface(s) of the hole. The coating could be applied to the fastener assembly by an automated conventional method (eg., plating, paint spraying, flame spraying) which is controllable and inexpensive.

In one application of the technique of this invention, the coating composition is applied to monolithic fasteners installed in titanium matrix composite structures. After heating, the fastener bearing the coating composition expands at a much higher rate than the adjacent substrate material, thereby forming intimate contact with the hole surface(s), and a diffusion of the coating composition into the surface(s) takes place. The result is the formation of a corrosion-resistant interface layer on the hole surface(s).

In the context of a hypersonic vehicle, the present invention contemplates that reaction of the fastener coating composition with the substrate material (i.e., the material of the panel members) will take place during a heat-up cycle, either during or as a result of the flight or through an induced method. Induced heating could be accomplished by any method capable of attaining the requisite temperature, as for example induction, resistance, or laser heating. Optimally, the coating material should be able to react at a temperature below the temperature where the material of the structures becomes susceptible to adverse environmental conditions.

Figure 3:
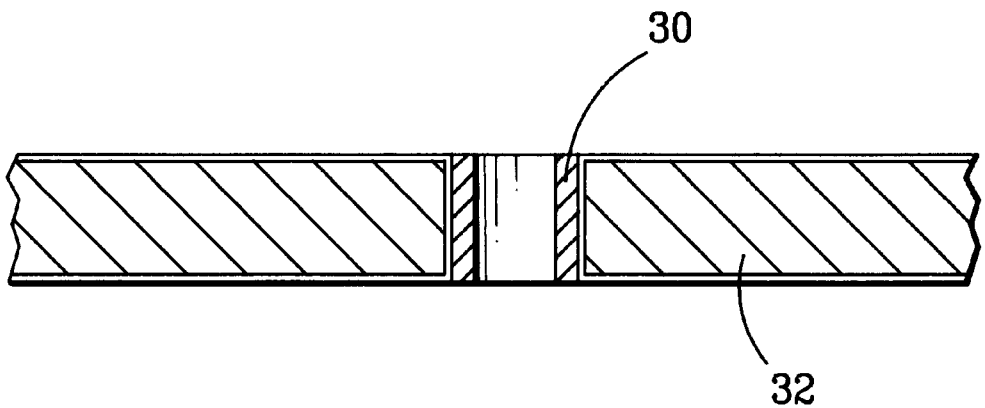
FIG. 3 is a sectional view of one structural member with the fastener means positioned therein.

FIG. 3 shows another use of the present invention, where a member 30 bearing the coating composition described above has been inserted in an opening in a single panel structure 32. Member 30 could be any structure capable of its own function, as for example, a support member, a conduit or a bearing sleeve, etc., but one which has a coefficient of expansion greater than the panel structure. The coating composition is disposed on the exterior of the member 30, and the member 30 is secured within the opening of the panel structure. Upon appropriate heating of the panel structure, the member 30 expands at a rate greater than the panel structure, and the coating composition is caused to diffuse into the surface of the panel within the opening to thereby form a coating on the panel surface(s) within the opening. This transferred coating composition, now secured to the panel material through a diffusion interface, provides a corrosion-resistant surface which, even if the member is subsequently removed from the opening in the panel structure, will remain intact.

While certain representative embodiments and details have been shown for the purpose of illustrating the invention, it will be apparent to those skilled in this art that various changes and modifications may be made therein without departing from the spirit or scope of this invention.

What I claim is:

1. A method for creating a contamination-preventing seal at a selected surface region of an environmentally-reactive structural component, said method comprising:

providing a member having a coefficient of expansion greater than the coefficient of expansion of said structural component, applying a coating material to the exterior of said member, placing said member in contact with said structural component, and heating said member to a predetermined temperature such that said member expands into intimate contact with said structural component and said coating material diffuses into the material of said structural component to thereby form a seal at said selected surface region which is environmentally resistant.

2. The method of claim 1, wherein said step of applying comprises spraying said coating material onto the external surfaces of said fastener elements.

3. The method of claim 1, wherein said step of applying said coating material comprises using automated equipment.

4. The method of claim 1, wherein said coating comprises a titanium aluminide material.

5. The method of claim 1, wherein the structural components are made of one of the group of metallic, intermetallic, ceramic or metal matrix composite materials, and said step of heating comprises raising the temperature of said coating material to a level below the temperature at which the material of the structural components becomes susceptible to adverse environmental conditions.

6. The method of claim 1, wherein said coating is formed entirely within said holes.

7. The method of claim 1, wherein said member comprises fastener means and the selected surface region is an opening in the structural component.

* * * * *